US009656348B2

(12) United States Patent
Nakamura

(10) Patent No.: US 9,656,348 B2
(45) Date of Patent: May 23, 2017

(54) LASER PROCESSING APPARATUS

(71) Applicant: DISCO CORPORATION, Tokyo (JP)

(72) Inventor: Masaru Nakamura, Tokyo (JP)

(73) Assignee: Disco Corporation, Tokyo (JP)

( * ) Notice: Subject to any disclaimer, the term of this patent is extended or adjusted under 35 U.S.C. 154(b) by 216 days.

(21) Appl. No.: 14/701,856

(22) Filed: May 1, 2015

(65) Prior Publication Data

US 2015/0321284 A1    Nov. 12, 2015

(30) Foreign Application Priority Data

May 9, 2014    (JP) .................................. 2014-097704

(51) Int. Cl.

| | |
|---|---|
| B23K 26/00 | (2014.01) |
| B23K 26/03 | (2006.01) |
| B23K 26/08 | (2014.01) |
| B23K 26/0622 | (2014.01) |
| B24C 1/06 | (2006.01) |
| B23K 26/402 | (2014.01) |
| B23K 26/364 | (2014.01) |
| B23K 101/40 | (2006.01) |

(52) U.S. Cl.
CPC ...... *B23K 26/0622* (2015.10); *B23K 26/0066* (2013.01); *B23K 26/032* (2013.01); *B23K 26/083* (2013.01); *B23K 26/0853* (2013.01); *B23K 26/0869* (2013.01); *B23K 26/0876* (2013.01); *B23K 26/364* (2015.10); *B23K 26/402* (2013.01); *B24C 1/06* (2013.01); *B23K 2201/40* (2013.01)

(58) Field of Classification Search
CPC .............. B23K 26/0066; B23K 26/083; B23K 26/0869; B23K 26/032

USPC ............. 219/121.61–121.72, 121.82, 121.83
See application file for complete search history.

(56) References Cited

U.S. PATENT DOCUMENTS

| | | | | |
|---|---|---|---|---|
| 4,806,724 A | * | 2/1989 | Kawai ................... | B23K 26/06 219/121.68 |
| 2005/0150877 A1 | * | 7/2005 | Araki ..................... | B23K 26/40 219/121.67 |
| 2009/0032512 A1 | * | 2/2009 | Regaard ............... | B23K 26/032 219/121.83 |

FOREIGN PATENT DOCUMENTS

JP        2010-127920         6/2010

* cited by examiner

*Primary Examiner* — Samuel M Heinrich
(74) *Attorney, Agent, or Firm* — Greer Burns & Crain Ltd.

(57) ABSTRACT

A laser processing apparatus includes a holding table for holding a workpiece, a laser beam applying unit for applying a laser beam to the workpiece, a feeding mechanism for relatively moving the holding table and the laser beam applying unit, a detector for applying detection light to the workpiece and detecting the quantity of reflected light obtained by the reflection of the detection light from the workpiece, and a controller for determining whether or not the workpiece is present at a laser beam applying position according to a detection signal output from the detector. The holding table includes a holding member for holding the workpiece under suction and an annular mount member provided so as to surround the holding member for mounting the holding member. The mount member has an upper surface treated by an irregular reflection process for irregularly reflecting light.

2 Claims, 9 Drawing Sheets

LASER PROCESSING APPARATUS

BACKGROUND OF THE INVENTION

Field of the Invention

The present invention relates to a laser processing apparatus for performing laser processing to a workpiece such as a semiconductor wafer.

Description of the Related Art

In a semiconductor device fabrication process, a plurality of crossing division lines are formed on the front side of a substantially disk-shaped semiconductor wafer to thereby define a plurality of separate regions where a plurality of devices such as ICs and LSIs are respectively formed. The semiconductor wafer is cut along the division lines to thereby divide the regions where the devices are formed from each other, thus obtaining a plurality of individual semiconductor chips.

As a method of dividing such a semiconductor wafer along the division lines, there has been tried a laser processing method using a pulsed laser beam having a transmission wavelength to the wafer to apply the pulsed laser beam to the wafer in the condition where the focal point of the pulsed laser beam is set inside the wafer in its subject area to be divided. In such a dividing method using this laser processing method, a pulsed laser beam having a transmission wavelength to the wafer is applied to the wafer from one side thereof in the condition where the focal point of the pulsed laser beam is set inside the wafer, thereby continuously forming a modified layer inside the wafer along each division line. Thereafter, an external force is applied to the wafer along each division line where the modified layer is formed to be reduced in strength, thereby dividing the wafer along each division line.

As another method of dividing a platelike workpiece such as a semiconductor wafer along the division lines, there has been proposed a method of applying a pulsed laser beam having an absorption wavelength to the workpiece along the division lines to thereby form a laser processed groove on the workpiece along each division line by ablation and next breaking the workpiece along each laser processed groove by using a mechanical breaking apparatus.

Such laser processing is performed by using a laser processing apparatus including a holding table for holding a workpiece, laser beam applying means for applying a laser beam to the workpiece held on the holding table, and feeding means for relatively moving the holding table and the laser beam applying means in a feeding direction. In such a laser processing apparatus, there is a problem such that when the laser beam overruns the workpiece held on the holding table, the upper surface of the holding table may be damaged by the laser beam.

To solve this problem, there has been proposed a laser processing apparatus including detecting means for applying detection light to a workpiece held on a holding table and detecting whether or not the workpiece is present at a laser beam applying position according to the intensity of return light reflected from the workpiece, wherein when the detecting means detects that the workpiece held on the holding table is not present at the laser beam applying position, the application of a laser beam from laser beam applying means is stopped (see Japanese Patent Laid-open No. 2010-127920, for example).

SUMMARY OF THE INVENTION

However, in the case that there is no difference in intensity between the return light reflected from the workpiece held on the holding table and the return light obtained by the reflection of the detection light deviated from the workpiece and applied to a mount member constituting the holding table, the mount member of the holding table cannot be differentiated from the workpiece, so that there is a possibility that the laser beam may be applied from the laser beam applying means to the mount member of the holding table, causing a problem such that the operator may be endangered and the holding table may be damaged by the laser beam. Furthermore, the laser beam cannot be properly applied to the workpiece.

It is therefore an object of the present invention to provide a laser processing apparatus which can reliably detect the difference in light quantity between the reflected light from the workpiece held on the holding table and the reflected light from the mount member of the holding table.

In accordance with an aspect of the present invention, there is provided a laser processing apparatus including a holding table for holding a workpiece; laser beam applying means for applying a laser beam to the workpiece held on the holding table; moving means for relatively moving the holding table and the laser beam applying means; detecting means for applying detection light to the workpiece held on the holding table and detecting the quantity of reflected light obtained by the reflection of the detection light from the workpiece; and control means for determining whether or not the workpiece is present at a laser beam applying position according to a detection signal output from the detecting means; wherein the holding table includes a holding member for holding the workpiece under suction and an annular mount member provided so as to surround the holding member for mounting the holding member, the mount member having an upper surface treated by an irregular reflection process for irregularly reflecting light.

Preferably, the irregular reflection process includes blasting.

In the present invention, the holding table for holding the workpiece includes the holding member for holding the workpiece under suction and the annular mount member provided so as to surround the holding member for mounting the holding member, wherein the mount member has an upper surface treated by an irregular reflection process for irregularly reflecting light. Accordingly, the detection light applied to the upper surface of the mount member is irregularly reflected on the upper surface of the mount member, so that the quantity of the reflected light detected by the detecting means is reduced as compared with the case that the detection light is reflected from the workpiece. Accordingly, the control means can immediately detect that the detection light has just been deviated from the workpiece held on the holding table. As a result, there is no possibility that the laser beam from the laser beam applying means is not applied to the upper surface of the mount member of the holding table, thereby solving the problem that the operator may be endangered and the holding table may be damaged by the laser beam.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
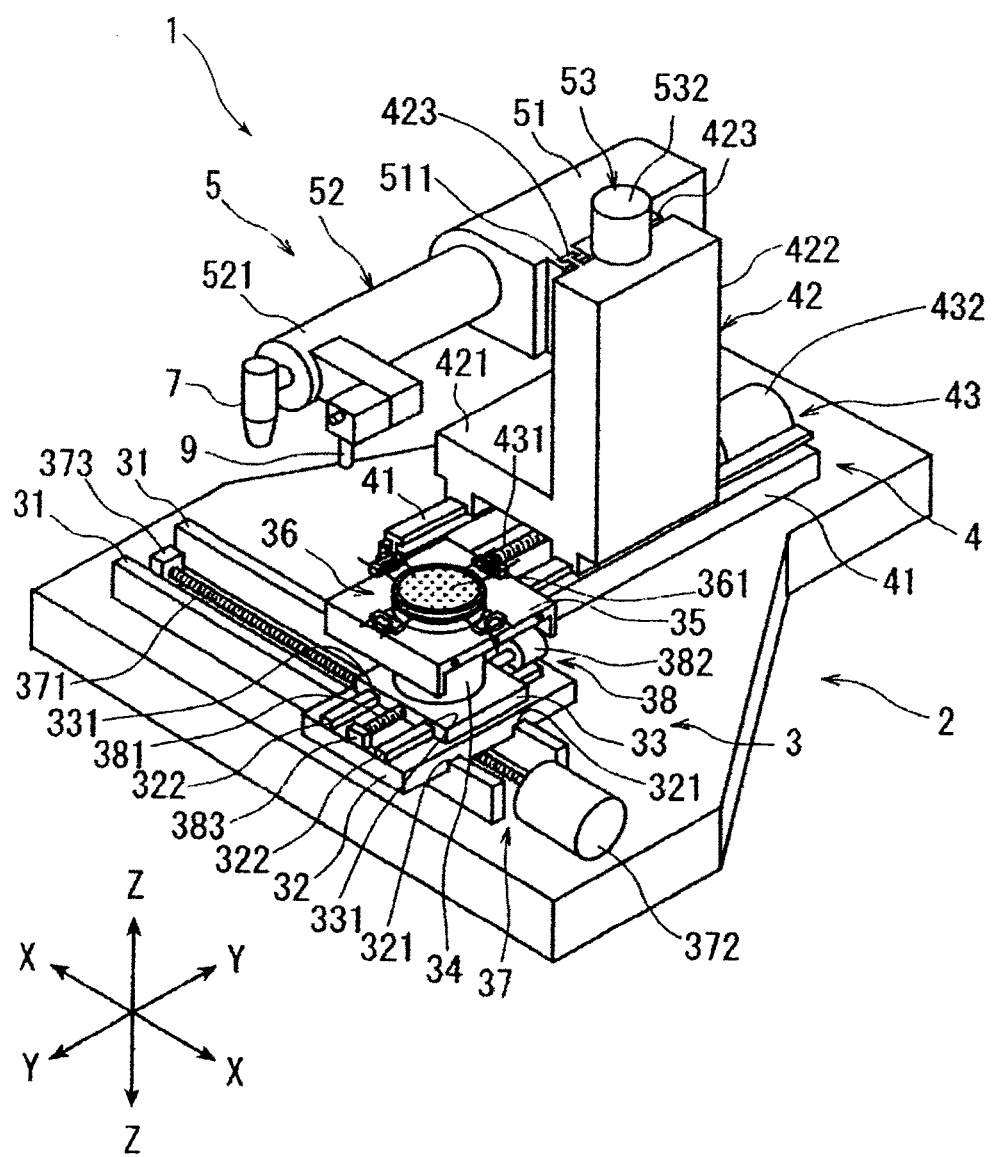
FIG. 1 is a perspective view of a laser processing apparatus according to a preferred embodiment of the present invention.

A preferred embodiment of the laser processing apparatus according to the present invention will now be described in detail with reference to the attached drawings. FIG. 1 is a perspective view of a laser processing apparatus 1 according to a preferred embodiment of the present invention. The laser processing apparatus 1 shown in FIG. 1 includes a stationary base 2, a holding table mechanism 3 for holding a workpiece, the holding table mechanism 3 being provided on the stationary base 2 so as to be movable in a feeding direction (X direction) shown by an arrow X, a laser beam applying unit supporting mechanism 4 provided on the stationary base 2 so as to be movable in an indexing direction (Y direction) shown by an arrow Y perpendicular to the X direction, and a laser beam applying unit 5 provided on the laser beam applying unit supporting mechanism 4 so as to be movable in a focal position adjusting direction (Z direction) shown by an arrow Z.

Figure 2:
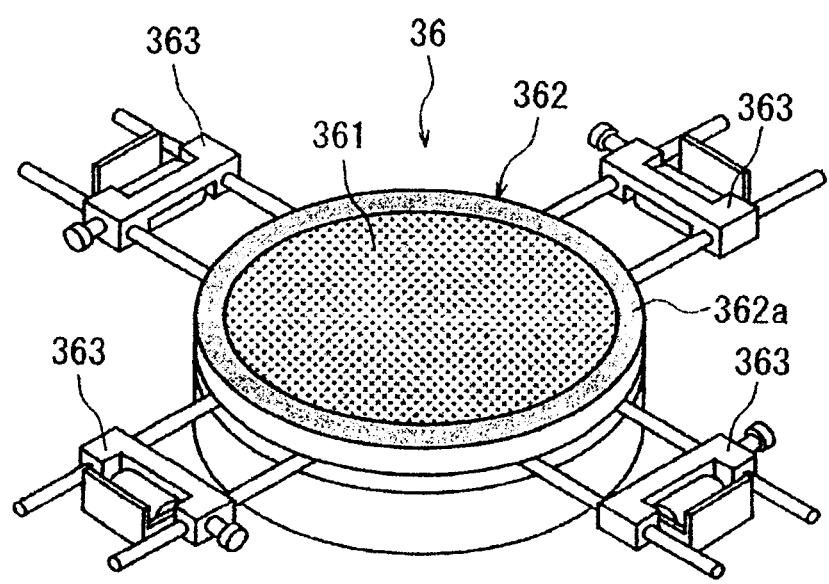
FIG. 2 is a perspective view of a holding table for holding a workpiece under suction, the holding table being included in the laser processing apparatus shown in FIG. 1.

The holding table mechanism 3 includes a pair of guide rails 31 provided on the stationary base 2 so as to extend parallel to each other in the X direction, a first slide block 32 provided on the guide rails 31 so as to be movable in the X direction, a second slide block 33 provided on the first slide block 32 so as to be movable in the Y direction, a cover table 35 supported by a cylindrical member 34 standing on the second slide block 33, and a holding table 36 as workpiece holding means. The holding table 36 will now be described with reference to FIG. 2. As shown in FIG. 2, the holding table 36 includes a circular holding member 361 formed of a porous material such as porous ceramics and an annular mount member 362 provided so as to surround the holding member 361 for mounting the holding member 361. The mount member 362 is formed of a metal material such as stainless steel. The mount member 362 has an upper surface 362a treated by an irregular reflection process for irregularly reflecting light. Preferably, blasting such as sand blasting and shot blasting is adopted as the irregular reflection process. The holding table 36 is provided with a plurality of clamps 363 for fixing an annular frame to be hereinafter described. Further, the holding table 36 is rotatable by a pulse motor (not shown) provided in the cylindrical member 34.

The lower surface of the first slide block 32 is formed with a pair of guided grooves 321 for slidably engaging the pair of guide rails 31 mentioned above. A pair of guide rails 322 are provided on the upper surface of the first slide block 32 so as to extend parallel to each other in the Y direction. Accordingly, the first slide block 32 is movable in the X direction along the guide rails 31 by the slidable engagement of the guided grooves 321 with the guide rails 31. The holding table mechanism 3 further includes X direction moving means 37 for moving the first slide block 32 in the X direction along the guide rails 31. The X direction moving means 37 includes an externally threaded rod 371 extending parallel to the guide rails 31 so as to be interposed therebetween and a pulse motor 372 as a drive source for rotationally driving the externally threaded rod 371. The externally threaded rod 371 is rotatably supported at one end thereof to a bearing block 373 fixed to the stationary base 2 and is connected at the other end to the output shaft of the pulse motor 372 so as to receive the torque thereof. The externally threaded rod 371 is engaged with a tapped through hole formed in an internally threaded block (not shown) projecting from the lower surface of the first slide block 32 at a central portion thereof. Accordingly, the first slide block 32 is moved in the X direction along the guide rails 31 by operating the pulse motor 372 to normally or reversely rotate the externally threaded rod 371.

The lower surface of the second slide block 33 is formed with a pair of guided grooves 331 for slidably engaging the pair of guide rails 322 provided on the upper surface of the first slide block 32 as mentioned above. Accordingly, the second slide block 33 is movable in the Y direction along the guide rails 322 by the slidable engagement of the guided grooves 331 with the guide rails 322. The holding table mechanism 3 further includes first Y direction moving means 38 for moving the second slide block 33 in the Y direction along the guide rails 322. The first Y direction moving means 38 includes an externally threaded rod 381 extending parallel to the guide rails 322 so as to be interposed therebetween and a pulse motor 382 as a drive source for rotationally driving the externally threaded rod 381. The externally threaded rod 381 is rotatably supported at one end thereof to a bearing block 383 fixed to the upper surface of the first slide block 32 and is connected at the other end to the output shaft of the pulse motor 382 so as to receive the torque thereof. The externally threaded rod 381 is engaged with a tapped through hole formed in an internally threaded block (not shown) projecting from the lower surface of the second slide block 33 at a central portion thereof. Accordingly, the second slide block 33 is moved in the Y direction along the guide rails 322 by operating the pulse motor 382 to normally or reversely rotate the externally threaded rod 381.

The laser beam applying unit supporting mechanism 4 includes a pair of guide rails 41 provided on the stationary base 2 so as to extend parallel to each other in the Y direction and a movable support base 42 provided on the guide rails 41 so as to be movable in the Y direction. The movable support base 42 is composed of a horizontal portion 421 slidably supported to the guide rails 41 and a vertical portion 422 extending vertically upward from the upper surface of the horizontal portion 421. Further, a pair of guide rails 423 are provided on one side surface of the vertical portion 422 so as to extend parallel to each other in the Z direction. The laser beam applying unit supporting mechanism 4 further includes second Y direction moving means 43 for moving the movable support base 42 in the Y direction along the guide rails 41. The second Y direction moving means 43 includes an externally threaded rod 431 extending parallel to the guide rails 41 so as to be interposed therebetween and a pulse motor 432 as a drive source for rotationally driving the externally threaded rod 431. The externally threaded rod 431 is rotatably supported at one end thereof to a bearing block (not shown) fixed to the stationary base 2 and is connected at the other end to the output shaft of the pulse motor 432 so as to receive the torque thereof. The externally threaded rod 431 is engaged with a tapped through hole formed in an internally threaded block (not shown) projecting from the lower surface of the horizontal portion 421 at a central portion thereof. Accordingly, the movable support base 42 is moved in the Y direction along the guide rails 41 by operating the pulse motor 432 to normally or reversely rotate the externally threaded rod 431.

The laser beam applying unit 5 includes a unit holder 51 and laser beam applying means 52 mounted to the unit holder 51. The unit holder 51 is formed with a pair of guided grooves 511 for slidably engaging the pair of guide rails 423 provided on the vertical portion 422 of the movable support base 42. Accordingly, the unit holder 51 is supported to the movable support base 42 so as to be movable in the Z direction by the slidable engagement of the guided grooves 511 with the guide rails 423.

The laser beam applying unit 5 further includes Z direction moving means 53 for moving the unit holder 51 along the guide rails 423 in the Z direction. The Z direction moving means 53 includes an externally threaded rod (not shown) extending parallel to the guide rails 423 so as to be interposed therebetween and a pulse motor 532 as a drive source for rotationally driving this externally threaded rod. Accordingly, the unit holder 51 and the laser beam applying means 52 are moved in the Z direction along the guide rails 423 by operating the pulse motor 532 to normally or reversely rotate this externally threaded rod. In this preferred embodiment, when the pulse motor 532 is normally operated, the laser beam applying means 52 is moved upward, whereas when the pulse motor 532 is reversely operated, the laser beam applying means 52 is moved downward.

Figure 3:
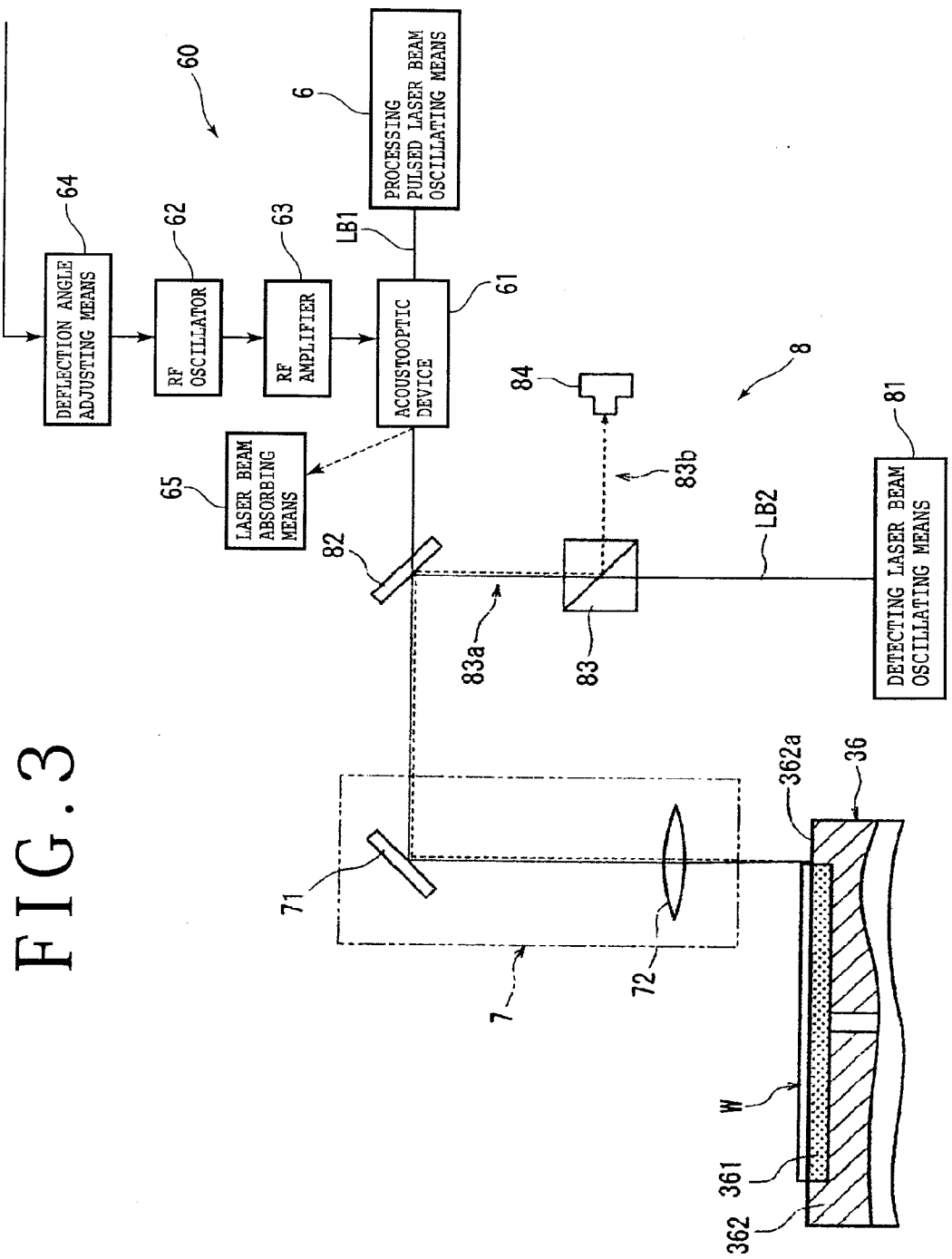
FIG. 3 is a block diagram showing the configuration of detecting means for applying detection light to the workpiece held on the holding table and detecting the quantity (intensity) of reflected light obtained by the reflection of the detection light from the workpiece.

The laser beam applying means 52 includes a cylindrical casing 521 fixed to the unit holder 51 so as to extend in a substantially horizontal direction. The cylindrical casing 521 contains processing pulsed laser beam oscillating means 6 shown in FIG. 3. Further, focusing means 7 is provided at the front end of the casing 521. The focusing means 7 functions to apply a processing pulsed laser beam oscillated from the processing pulsed laser beam oscillating means 6 toward a workpiece W held on the holding table 36 as shown in FIG. 3. More specifically, the processing pulsed laser beam oscillating means 6 oscillates a processing pulsed laser beam LB1 having a wavelength of 1342 nm or 355 nm.

As shown in FIG. 3, the focusing means 7 includes a direction changing mirror 71 for downwardly changing the traveling direction of the processing pulsed laser beam LB1 oscillated from the processing pulsed laser beam oscillating means 6 and a focusing lens 72 for focusing the processing pulsed laser beam LB1 whose traveling direction has been changed by the direction changing mirror 71. The processing pulsed laser beam LB1 focused by the focusing lens 72 is applied to the workpiece W held on the holding table 36 as shown in FIG. 3.

The laser beam applying means 52 further includes beam deflecting means 60 (see FIG. 3) for deflecting the beam axis of the processing pulsed laser beam LB1 oscillated from the processing pulsed laser beam oscillating means 6. As shown in FIG. 3, the beam deflecting means 60 includes an acoustooptic device 61 provided on the beam axis of the processing pulsed laser beam LB1 oscillated from the processing pulsed laser beam oscillating means 6, an RF oscillator 62 for generating an RF (radio frequency) signal to be applied to the acoustooptic device 61, an RF amplifier 63 for amplifying the power of the RF signal generated by the RF oscillator 62 and applying the amplified RF signal to the acoustooptic device 61, and deflection angle adjusting means 64 for adjusting the frequency of the RF signal to be generated by the RF oscillator 62. The acoustooptic device 61 can adjust the angle of deflection of the beam axis of the processing pulsed laser beam LB1 according to the frequency of the RF signal applied. The deflection angle adjusting means 64 is controlled by control means to be hereinafter described. The beam deflecting means 60 further includes laser beam absorbing means 65 for absorbing the processing pulsed laser beam LB1 deflected by the acoustooptic device 61 as shown by a broken line in FIG. 3 in the case that an RF signal having a predetermined frequency is applied to the acoustooptic device 61.

The operation of the beam deflecting means 60 will now be described with reference to FIG. 3. In the case that a voltage of 0 V, for example, is applied to the deflection angle adjusting means 64 of the beam deflecting means 60 and an RF signal having a frequency corresponding to 0 V is applied to the acoustooptic device 61, the beam axis of the processing pulsed laser beam LB1 oscillated from the processing pulsed laser beam oscillating means 6 is directed toward the direction changing mirror 71 of the focusing means 7. In the case that a voltage of 10 V, for example, is applied to the deflection angle adjusting means 64 and an RF signal having a frequency corresponding to 10 V is applied to the acoustooptic device 61, the processing pulsed laser beam LB1 oscillated from the processing pulsed laser beam oscillating means 6 is led to the laser beam absorbing means 65 as shown by the broken line in FIG. 3.

Referring again to FIG. 3, the laser processing apparatus 1 further includes detecting means 8 for detecting whether or not the workpiece W held on the holding table 36 is present below the focusing means 7. The detecting means 8 includes detecting laser beam oscillating means 81 for oscillating a detecting laser beam as detection light, a dichroic mirror 82 provided between the beam deflecting means 60 and the focusing means 7 for reflecting the detecting laser beam oscillated from the detecting laser beam oscillating means 81 and directing the reflected beam toward the focusing means 7, and a beam splitter 83 provided between the detecting laser beam oscillating means 81 and the dichroic mirror 82 for transmitting the detecting laser beam oscillated from the detecting laser beam oscillating means 81 and directing the transmitted beam through a first path 83a to the dichroic mirror 82.

The detecting laser beam oscillating means 81 may be provided by an oscillator for oscillating a detecting laser beam LB2 having reflectivity to the workpiece W. Examples of such an oscillator include an SLD (Super Luminescent Diode, λ: 830 nm), LD, and LED. In this preferred embodiment, the power of the detecting laser beam LB2 to be oscillated from the detecting laser beam oscillating means 81 is set to 10 mW. The dichroic mirror 82 functions to transmit the processing pulsed laser beam LB1 and reflect the detecting laser beam LB2 oscillated from the detecting laser beam oscillating means 81 toward the focusing means 7. The beam splitter 83 functions to transmit the detecting laser beam LB2 oscillated from the detecting laser beam oscillating means 81 and to direct the transmitted beam through the first path 83a to the dichroic mirror 82. The beam splitter 83 also functions to lead reflected light from the workpiece W on the holding table 36 through the dichroic mirror 82 to a second path 83b. This reflected light will be hereinafter described. The detecting means 8 further includes a photodetector 84 provided on the second path 83b for detecting the reflected light reflected by the beam splitter 83. The photodetector 84 functions to produce a voltage signal corresponding to the quantity of the reflected light detected above, wherein this voltage signal is transmitted to the control means to be hereinafter described.

The operation of the detecting means 8 will now be described with reference to FIG. 3. The detecting laser beam LB2 oscillated from the detecting laser beam oscillating means 81 is transmitted through the beam splitter 83 to reach the dichroic mirror 82. The detecting laser beam LB2 is next reflected by the dichroic mirror 82 and directed toward the direction changing mirror 71 of the focusing means 7. The detecting laser beam LB2 is next reflected from the direction changing mirror 71 and directed toward the focusing lens 72 of the focusing means 7. Then, the detecting laser beam LB2 is focused by the focusing lens 72 as in the case of the processing pulsed laser beam LB1. The detecting laser beam LB2 is next applied to the workpiece W held on the holding table 36 and reflected from the upper surface of the workpiece W. The detecting laser beam LB2 reflected from the upper surface of the workpiece W functions as reflected light, which is led through the focusing lens 72, the direction changing mirror 71, the dichroic mirror 82, and the beam splitter 83 to the photodetector 84 as shown by a broken line in FIG. 3. Thus, the reflected light is detected by the photodetector 84 and a voltage signal corresponding to the quantity of the reflected light detected above is transmitted from the photodetector 84 to the control means to be hereinafter described.

The quantity of the reflected light to be detected by the photodetector 84 due to the reflection of the detecting laser beam LB2 will now be described. The detecting laser beam LB2 applied to the upper surface of the workpiece W held on the holding table 36 is regularly reflected on the upper surface of the workpiece W, and the whole of the resultant reflected light is led through the focusing lens 72, the direction changing mirror 71, the dichroic mirror 82, and the beam splitter 83 to the photodetector 84 as shown by the broken line in FIG. 3 and then detected by the photodetector 84. Accordingly, the quantity of the reflected light detected by the photodetector 84 is large. When the detecting laser beam LB2 applied to the upper surface of the workpiece W held on the holding table 36 is deviated from the workpiece W, the detecting laser beam LB2 is then applied to the upper surface 362a of the mount member 362 of the holding table 36. As described above, the upper surface 362a of the mount member 362 of the holding table 36 is treated by an irregular reflection process for irregularly reflecting light. Accordingly, the detecting laser beam LB2 applied to the upper surface 362a of the mount member 362 is irregularly reflected on the upper surface 362a, so that a part of the resultant reflected light is led through the focusing lens 72, the direction changing mirror 71, the dichroic mirror 82, and the beam splitter 83 to the photodetector 84 and then detected by the photodetector 84. Accordingly, the quantity of the reflected light detected by the photodetector 84 is smaller than that of the reflected light obtained by the regular reflection on the upper surface of the workpiece W.

Referring back to FIG. 1, the laser processing apparatus 1 further includes imaging means 9 provided at the front end portion of the casing 521 of the laser beam applying means 52 for imaging a subject area of the workpiece to be laser-processed by the laser beam applying means 52. The imaging means 9 includes an ordinary imaging device (CCD) for imaging the workpiece by using visible light, infrared light applying means for applying infrared light to the workpiece, an optical system for capturing the infrared light applied to the workpiece by the infrared light applying means, and an imaging device (infrared CCD) for outputting an electrical signal corresponding to the infrared light captured by the optical system. An image signal output from the imaging means 9 is transmitted to the control means 10 shown in FIG. 4.

Figure 4:
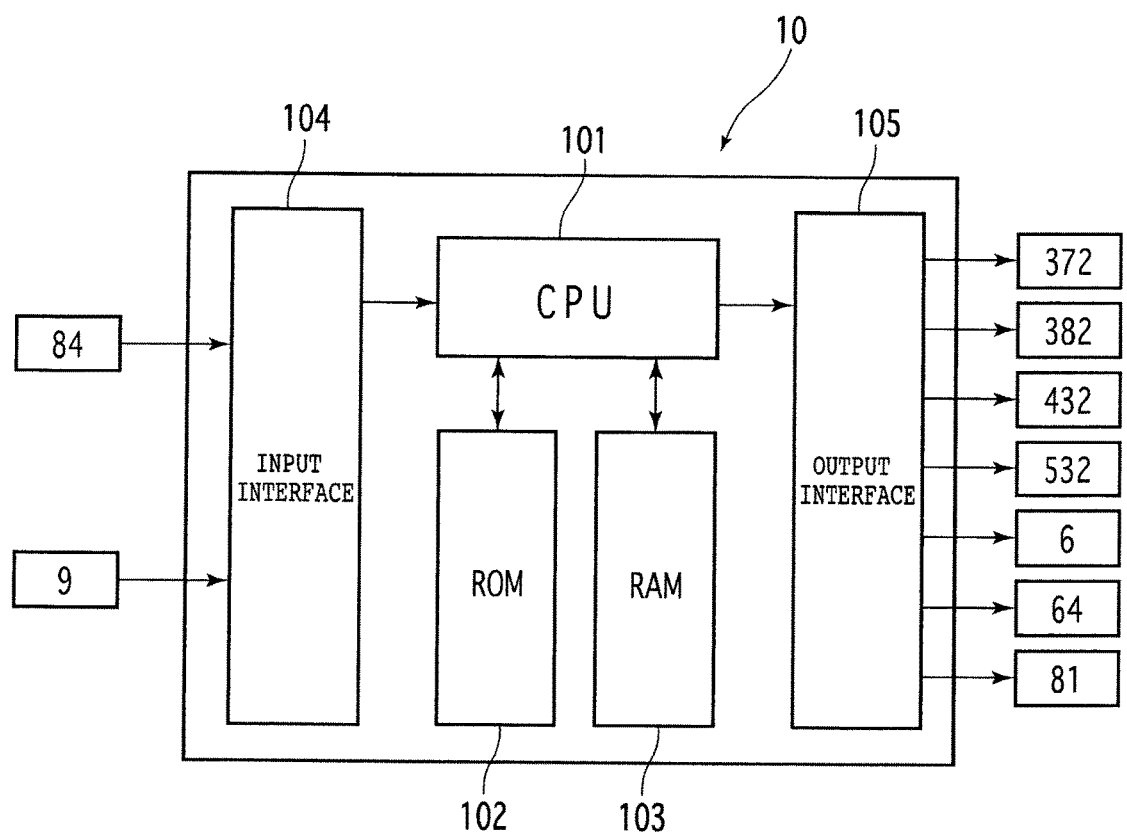
FIG. 4 is a block diagram of control means (controller) included in the laser processing apparatus shown in FIG. 1.

The laser processing apparatus 1 includes the control means 10 shown in FIG. 4. The control means 10 is configured by a computer, and it includes a central processing unit (CPU) 101 for performing operational processing according to a control program, a read only memory (ROM) 102 preliminarily storing the control program, a random access memory (RAM) 103 for storing the results of computation etc., an input interface 104, and an output interface 105. Detection signals from the photodetector 84 and the imaging means 9 are input into the input interface 104 of the control means 10. On the other hand, control signals are output from the output interface 105 of the control means 10 to the pulse motor 372 of the X direction moving means 37, the pulse motor 382 of the first Y direction moving means 38, the pulse motor 432 of the second Y direction moving means 43, the pulse motor 532 of the Z direction moving means 53, the processing pulsed laser beam oscillating means 6, the deflection angle adjusting means 64 of the beam deflecting means 60, and the detecting laser beam oscillating means 81.

Figure 5:
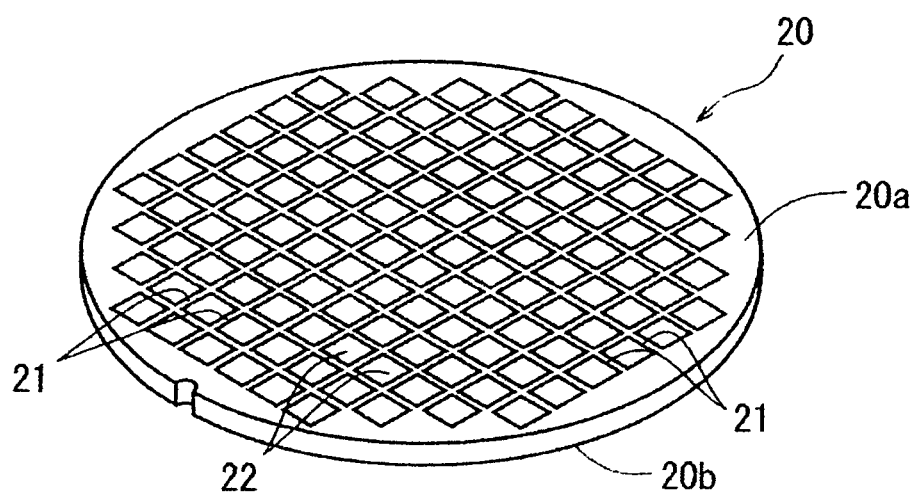
FIG. 5 is a perspective view of a semiconductor wafer as the workpiece.

The operation of the laser processing apparatus 1 configured above will now be described. FIG. 5 is a perspective view of a semiconductor wafer 20 as the workpiece to be laser-processed. The semiconductor wafer 20 is formed from a silicon wafer having a thickness of 200 μm, for example. The semiconductor wafer 20 has a front side 20a and a back side 20b. A plurality of crossing division lines 21 are formed on the front side 20a of the semiconductor wafer 20, thereby defining a plurality of rectangular separate regions where a plurality of devices 22 such as ICs and LSIs are respectively formed. There will now be described a processing method of forming a modified layer inside the semiconductor wafer 20 along each division line 21.

Figure 6A:
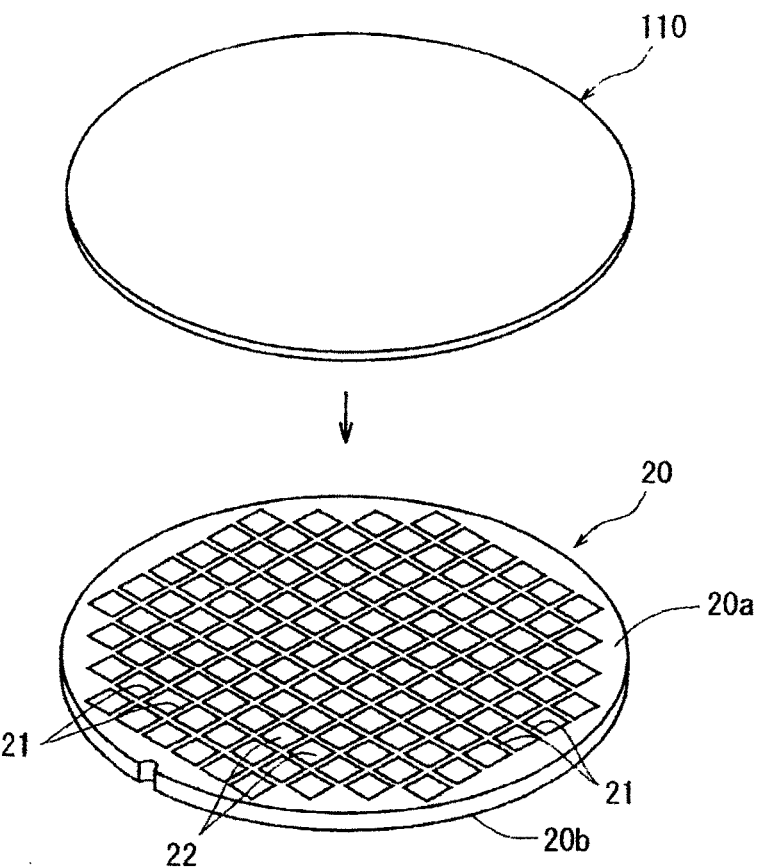
FIGS. 6A and 6B are perspective views for illustrating a protective member attaching step of attaching a protective tape to the front side of the semiconductor wafer shown in FIG. 5.
Figure 6B:
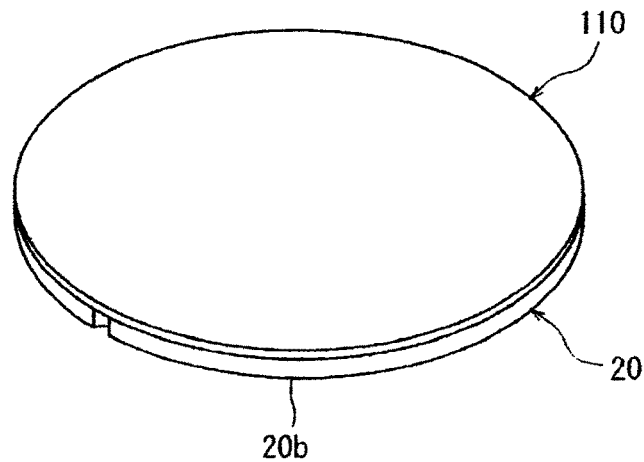

First, a protective member attaching step is performed in such a manner that a protective member is attached to the front side 20a of the semiconductor wafer 20, so as to protect the devices 22 formed on the front side 20a of the semiconductor wafer 20. More specifically, as shown in FIGS. 6A and 6B, a protective tape 110 as the protective member is attached to the front side 20a of the semiconductor wafer 20. The protective tape 110 is composed of a base sheet and an adhesive layer formed on the base sheet. For example, the base sheet has a thickness of 100 μm and the adhesive layer has a thickness of about 5 μm. The base sheet is formed of polyvinyl chloride (PVC) and the adhesive layer is formed of acrylic resin.

After performing the protective member attaching step mentioned above, the semiconductor wafer 20 is placed on the holding member 361 of the holding table 36 of the laser processing apparatus 1 shown in FIG. 1 in the condition where the protective tape 110 attached to the front side 20a of the wafer 20 is in contact with the holding member 361. Thereafter, suction means (not shown) is operated to hold the semiconductor wafer 20 through the protective tape 110 on the holding table 36 under suction (wafer holding step). Accordingly, the semiconductor wafer 20 is held on the holding table 36 in the condition where the back side 20b of the semiconductor wafer 20 is oriented upward.

After performing the wafer holding step mentioned above, the X direction moving means 37 is operated to move the holding table 36 holding the semiconductor wafer 20 to a position directly below the imaging means 9. In the condition where the holding table 36 is positioned directly below the imaging means 9, an alignment operation is performed by the imaging means 9 and the control means 10 to detect a subject area of the semiconductor wafer 20 to be laser-processed. More specifically, the imaging means 9 and the control means 10 perform image processing such as pattern matching for making the alignment of the division lines 21 extending in a first direction on the semiconductor wafer 20 and the focusing means 7 of the laser beam applying means 52 for applying a laser beam along the division lines 21, thereby performing the alignment of a laser beam applying position. This alignment operation is performed similarly for the remaining division lines 21 extending in a second direction perpendicular to the first direction on the semiconductor wafer 20. Although the front side 20a on which the division lines 21 of the semiconductor wafer 20 are formed is oriented downward, the division lines 21 can be imaged from the back side 20b through the semiconductor wafer 20 because the imaging means 9 includes the infrared light applying means for applying infrared light, the optical system for capturing the infrared light, and the imaging device (infrared CCD) for outputting an electrical signal corresponding to the infrared light as described above.

Figure 7A:
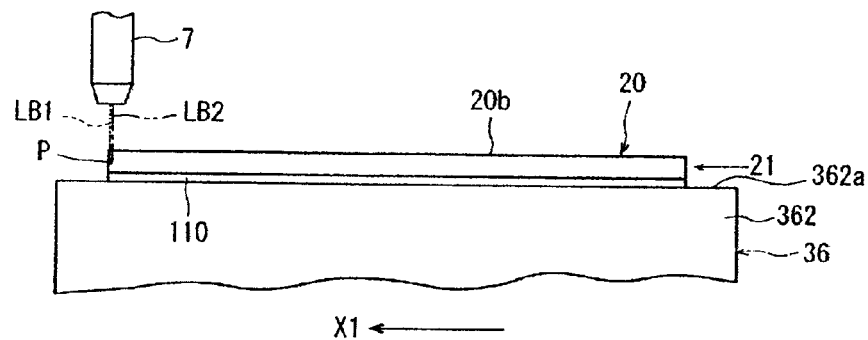
FIGS. 7A to 7D are sectional side views for illustrating a modified layer forming step to be performed by using the laser processing apparatus shown in FIG. 1.

After performing the alignment operation to detect all of the division lines 21 extending in the first and second directions on the semiconductor wafer 20 held on the holding table 36, the holding table 36 is moved to a laser beam applying area where the focusing means 7 of the laser beam applying means 52 is located. Then, one end (left end as viewed in FIG. 7A) of a predetermined one of the division lines 21 extending in the first direction is positioned directly below the focusing means 7 as shown in FIG. 7A. Thereafter, the focal point P of the processing pulsed laser beam LB1 to be applied from the focusing means 7 is set at an intermediate position in the direction of thickness of the semiconductor wafer 20. The wavelength of the processing pulsed laser beam LB1 is preliminarily set to 1342 nm, which is a transmission wavelength to the semiconductor wafer 20. The control means 10 operates the detecting laser beam oscillating means 81 of the detecting means 8 to apply the detecting laser beam LB2 from the focusing means 7. In the case that the voltage signal (V) input from the photodetector 84 is greater than a predetermined value (V1) (V>V1), the control means 10 determines that the semiconductor wafer 20 is present directly below the focusing means 7. In this case, the control means 10 operates the processing pulsed laser beam oscillating means 6 and also applies a voltage of 0 V, for example, to the deflection angle adjusting means 64 of the beam deflecting means 60. As a result, the processing pulsed laser beam LB1 oscillated from the processing pulsed laser beam oscillating means 6 is directed in its beam axis toward the focusing means 7 and then applied from the focusing means 7. In this manner, the detecting laser beam oscillating means 81 of the detecting means 8 is operated to apply the detecting laser beam LB2 from the focusing means 7 to the semiconductor wafer 20 held on the holding table 36. At the same time, the processing pulsed laser beam oscillating means 6 is operated to apply the processing pulsed laser beam LB1 from the focusing means 7 to the semiconductor wafer 20 held on the holding table 36. As applying the two laser beams LB1 and LB2 to the semiconductor wafer 20, the control means 10 operates the X direction moving means 37 to move the holding table 36 in the direction shown by an arrow X1 in FIG. 7A at a predetermined feed speed (first modified layer forming step).

Figure 7B:
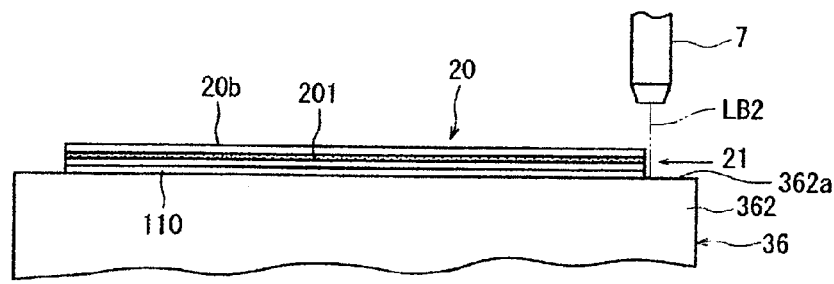

During the movement of the holding table 36 in the direction of the arrow X1, the control means 10 continues to input the voltage signal corresponding to the detected light quantity from the photodetector 84. In the case that the voltage signal (V) input from the photodetector 84 becomes less than or equal to the predetermined value (V1) (V≤V1), the control means 10 determines that the right end of the predetermined division line 21 of the semiconductor wafer 20 held on the holding table 36 has been deviated from the position directly below the focusing means 7 as shown in FIG. 7B and that the detecting laser beam LB2 is applied to the upper surface 362a of the mount member 362 of the holding table 36. In this case, the control means 10 applies a voltage of 10 V, for example, to the deflection angle adjusting means 64 of the beam deflecting means 60 and also stops the movement of the holding table 36. In other words, when the detecting laser beam LB2 is applied to the upper surface 362a of the mount member 362 of the holding table 36, the detecting laser beam LB2 applied is irregularly reflected on the upper surface 362a of the mount member 362 of the holding table 36 because the upper surface 362a is preliminarily treated by an irregular reflection process for irregularly reflecting light as described above. Accordingly, the quantity of the reflected light detected by the photodetector 84 is reduced, so that the control means 10 can immediately detect that the right end of the predetermined division line 21 of the semiconductor wafer 20 held on the holding table 36 has been deviated from the position directly below the focusing means 7 as shown in FIG. 7B. As a result, the processing pulsed laser beam LB1 oscillated from the processing pulsed laser beam oscillating means 6 is led to the laser beam absorbing means 65 as shown by the broken line in FIG. 3. Accordingly, the processing pulsed laser beam LB1 is not applied to the upper surface 362a of the mount member 362 of the holding table 36, thereby solving the problem that the operator may be endangered and the holding table 36 may be damaged by the processing laser beam. In this manner, the first modified layer forming step is performed to thereby form a modified layer 201 inside the semiconductor wafer 20 along the predetermined division line 21 as shown in FIG. 7B.

Figure 7C:
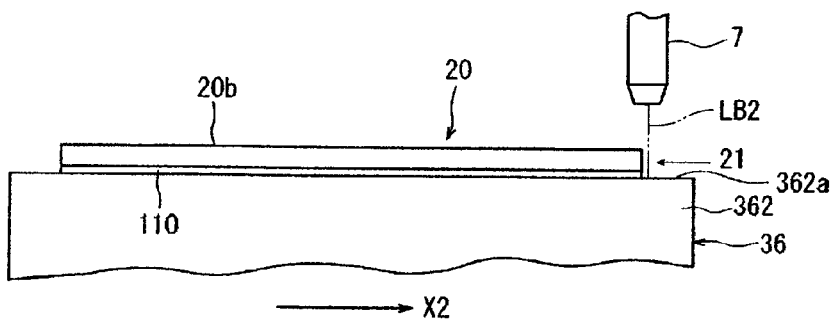
Figure 7D:
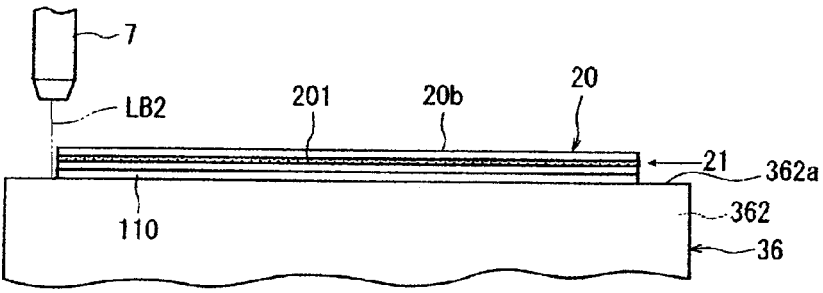

After performing the first modified layer forming step along the predetermined division line 21 as mentioned above, the first Y direction moving means 38 is operated to move (index) the holding table 36 in the Y direction by the pitch of the division lines 21, thereby obtaining the condition shown in FIG. 7C (indexing step). Thereafter, the detecting laser beam oscillating means 81 of the detecting means 8 is operated to apply the detecting laser beam LB2 from the focusing means 7 to the semiconductor wafer 20 held on the holding table 36. In the case that the voltage signal (V) input from the photodetector 84 is less than or equal to the predetermined value (V1) (V≤V1), the control means 10 determines that the semiconductor wafer 20 is not present directly below the focusing means 7. In this case, the control means 10 operates the X direction moving means 37 to move the holding table 36 in the direction shown by an arrow X2 in FIG. 7C. Thereafter, when the voltage signal (V) input from the photodetector 84 becomes greater than the predetermined value (V1) (V>V1), the control means 10 determines that the semiconductor wafer 20 is present directly below the focusing means 7. In this case, the control means 10 applies a voltage of 0 V, for example, to the deflection angle adjusting means 64 of the beam deflecting means 60, thereby applying the processing pulsed laser beam LB1 from the focusing means 7. At the same time, the control means 10 operates the X direction moving means 37 to move the holding table 36 in the direction of the arrow X2 in FIG. 7C at a predetermined feed speed (second modified layer forming step). Thereafter, when the voltage signal (V) input from the photodetector 84 becomes less than or equal to the predetermined value (V1) (V≤V1), the control means 10 determines that the left end of the present division line 21 adjacent to the above predetermined division line 21 of the semiconductor wafer 20 held on the holding table 36 has been deviated from the position directly below the focusing means 7 as shown in FIG. 7D and that the detecting laser beam LB2 is applied to the upper surface 362a of the mount member 362 of the holding table 36. In this case, the control means 10 applies a voltage of 10 V, for example, to the deflection angle adjusting means 64 of the beam deflecting means 60 and also stops the movement of the holding table 36. In this manner, the second modified layer forming step is performed to thereby form a similar modified layer 201 inside the semiconductor wafer 20 along the present division line 21 adjacent to the above predetermined division line 21 as shown in FIG. 7D.

After similarly performing the first modified layer forming step and the second modified layer forming step along all of the division lines 21 extending in the first direction on the semiconductor wafer 20, the holding table 36 is rotated 90° to similarly perform the first modified layer forming step and the second modified layer forming step along all of the remaining division lines 21 extending in the second direction perpendicular to the first direction. In this manner, the first modified layer forming step and the second modified layer forming step are performed along all of the crossing division lines 21 extending in the first and second directions on the semiconductor wafer 20. Thereafter, the holding table 36 holding the semiconductor wafer 20 is returned to the original position where the semiconductor wafer 20 has been initially held under suction, and the suction holding of the semiconductor wafer 20 is then canceled at this original position. Thereafter, the semiconductor wafer 20 is transferred by any transfer means (not shown) to a position where a dividing step is performed.

Figure 8A:
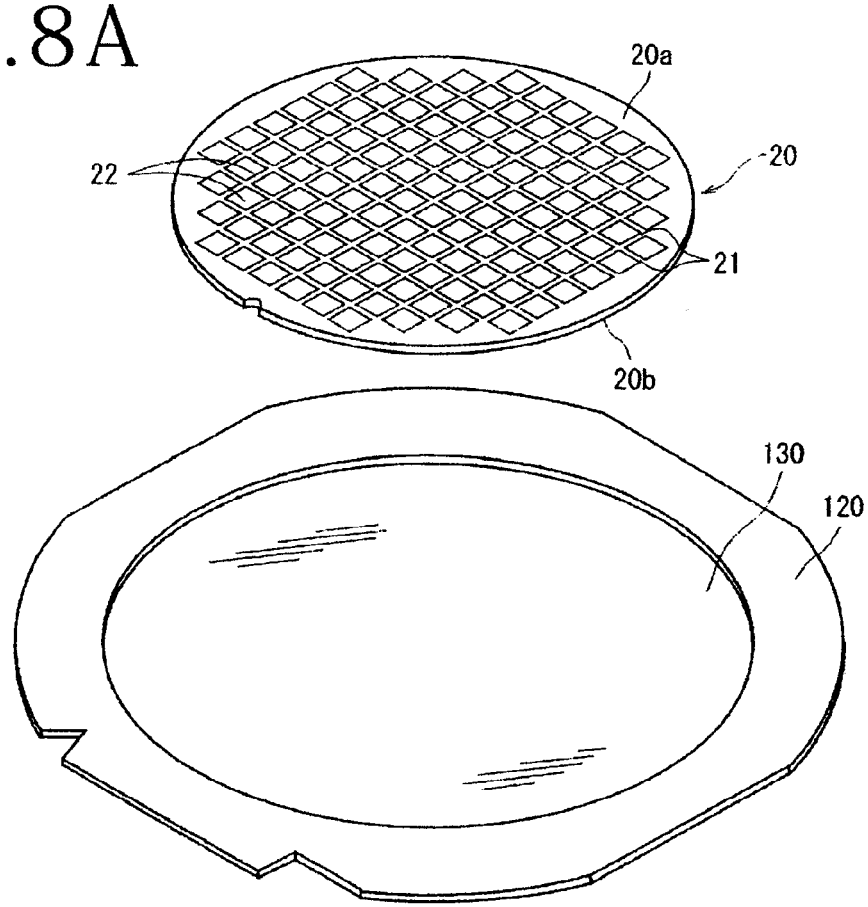
FIGS. 8A and 8B are perspective views for illustrating a wafer supporting step of attaching the semiconductor wafer to a dicing tape supported to an annular frame.
Figure 8B:
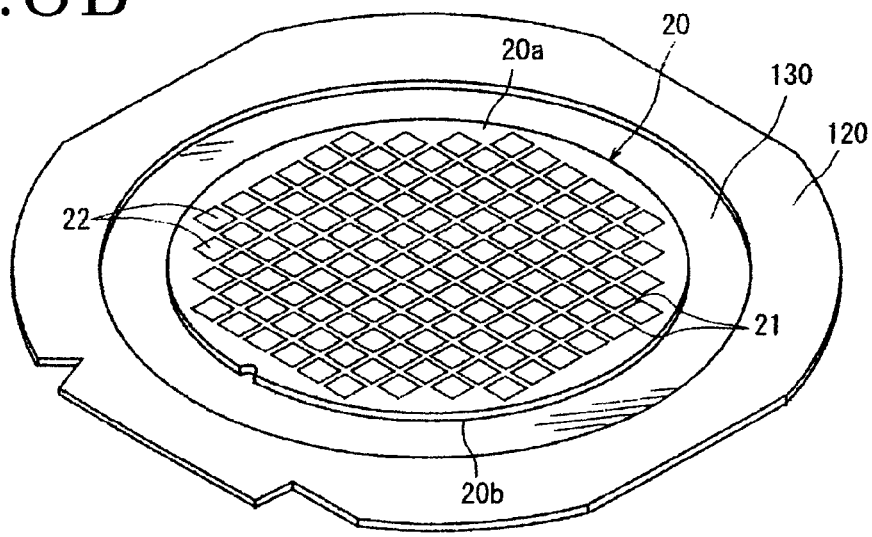

There will now be described a processing method of forming a laser processed groove on the semiconductor wafer 20 along each division line 21. Prior to forming such a laser processed groove on the semiconductor wafer 20 along each division line 21 by ablation, the back side 20b of the semiconductor wafer 20 is attached to a dicing tape 130 supported to an annular frame 120 as shown in FIGS. 8A and 8B (wafer supporting step).

After performing the wafer supporting step mentioned above, the semiconductor wafer 20 is placed on the holding member 361 of the holding table 36 of the laser processing apparatus 1 shown in FIG. 1 in the condition where the dicing tape 130 attached to the back side 20b of the wafer 20 is in contact with the holding member 361. Thereafter, suction means (not shown) is operated to hold the semiconductor wafer 20 through the dicing tape 130 on the holding table 36 under suction (wafer holding step). Further, the annular frame 120 supporting the semiconductor wafer 20 through the dicing tape 130 is fixed by the clamps 363 provided on the outer circumference of the holding table 36. Accordingly, the semiconductor wafer 20 is held on the holding table 36 in the condition where the front side 20a of the semiconductor wafer 20 is oriented upward.

Figure 9A:
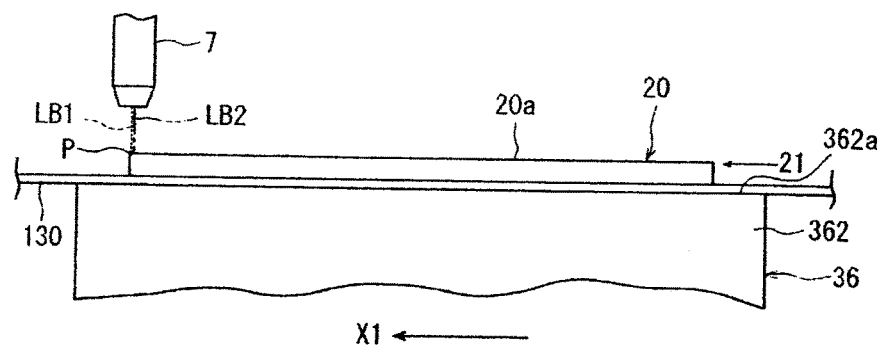
FIGS. 9A to 9D are sectional side views for illustrating a laser processed groove forming step to be performed by using the laser processing apparatus shown in FIG. 1.

After performing the wafer holding step mentioned above, the X direction moving means 37 is operated to move the holding table 36 holding the semiconductor wafer 20 under suction to a position directly below the imaging means 9. In the condition where the holding table 36 is positioned directly below the imaging means 9, an alignment operation is performed by the imaging means 9 and the control means 10 to detect a subject area of the semiconductor wafer 20 to be laser-processed. The alignment operation is performed in a manner similar to that mentioned above. Thereafter, the holding table 36 is moved to a laser beam applying area where the focusing means 7 of the laser beam applying means 52 is located. Then, one end (left end as viewed in FIG. 9A) of a predetermined one of the division lines 21 extending in the first direction is positioned directly below the focusing means 7 as shown in FIG. 9A. Thereafter, the focal point P of the processing pulsed laser beam LB1 to be applied from the focusing means 7 is set near the front side 20a (upper surface) of the semiconductor wafer 20. The wavelength of the processing pulsed laser beam LB1 is preliminarily set to 355 nm, which is an absorption wavelength to the semiconductor wafer 20. The control means 10 operates the detecting laser beam oscillating means 81 of the detecting means 8 to apply the detecting laser beam LB2 from the focusing means 7. In the case that the voltage signal (V) input from the photodetector 84 is greater than a predetermined value (V1) (V>V1), the control means 10 determines that the semiconductor wafer 20 is present directly below the focusing means 7. In this case, the control means 10 operates the processing pulsed laser beam oscillating means 6 and also applies a voltage of 0 V, for example, to the deflection angle adjusting means 64 of the beam deflecting means 60. As a result, the processing pulsed laser beam LB1 oscillated from the processing pulsed laser beam oscillating means 6 is directed in its beam axis toward the focusing means 7 and then applied from the focusing means 7. In this manner, the detecting laser beam oscillating means 81 of the detecting means 8 is operated to apply the detecting laser beam LB2 from the focusing means 7 to the semiconductor wafer 20 held on the holding table 36. At the same time, the processing pulsed laser beam oscillating means 6 is operated to apply the processing pulsed laser beam LB1 from the focusing means 7 to the semiconductor wafer 20 held on the holding table 36. As applying the two laser beams LB1 and LB2 to the semiconductor wafer 20, the control means 10 operates the X direction moving means 37 to move the holding table 36 in the direction shown by an arrow X1 in FIG. 9A at a predetermined feed speed (first laser processed groove forming step).

Figure 9B:
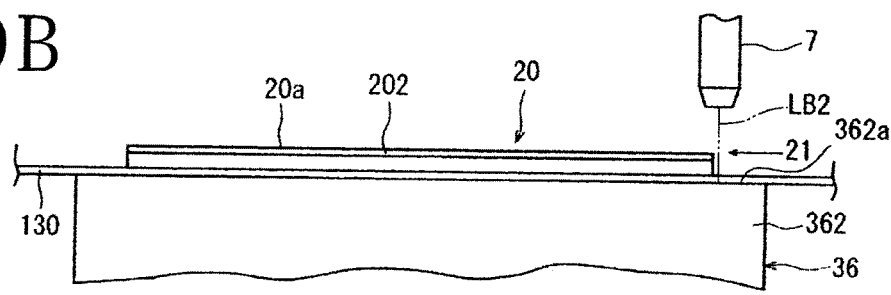

During the movement of the holding table 36 in the direction of the arrow X1, the control means 10 continues to input the voltage signal corresponding to the detected light quantity from the photodetector 84 of the detecting means 8. In the case that the voltage signal (V) input from the photodetector 84 becomes less than or equal to the predetermined value (V1) (V≤V1), the control means 10 determines that the right end of the predetermined division line 21 of the semiconductor wafer 20 held on the holding table 36 has been deviated from the position directly below the focusing means 7 as shown in FIG. 9B and that the detecting laser beam LB2 is applied through the dicing tape 130 to the upper surface 362a of the mount member 362 of the holding table 36. In this case, the control means 10 applies a voltage of 10 V, for example, to the deflection angle adjusting means 64 of the beam deflecting means 60 and also stops the movement of the holding table 36. In other words, when the detecting laser beam LB2 is applied to the upper surface 362a of the mount member 362 of the holding table 36, the detecting laser beam LB2 applied is irregularly reflected on the upper surface 362a of the mount member 362 of the holding table 36 because the upper surface 362a is preliminarily treated by an irregular reflection process for irregularly reflecting light as described above. Accordingly, the quantity of the reflected light detected by the photodetector 84 is reduced, so that the control means 10 can immediately detect that the right end of the predetermined division line 21 of the semiconductor wafer 20 held on the holding table 36 has been deviated from the position directly below the focusing means 7 as shown in FIG. 9B. As a result, the processing pulsed laser beam LB1 oscillated from the processing pulsed laser beam oscillating means 6 is led to the laser beam absorbing means 65 as shown by the broken line in FIG. 3 in a manner similar to that of the first and second modified layer forming steps mentioned above. Accordingly, the processing pulsed laser beam LB1 is not applied to the upper surface 362a of the mount member 362 of the holding table 36, thereby solving the problem that the operator may be endangered and the holding table 36 may be damaged by the processing laser beam. In this manner, the first laser processed groove forming step is performed to thereby form a laser processed groove 202 on the semiconductor wafer 20 along the predetermined division line 21 as shown in FIG. 9B.

Figure 9C:
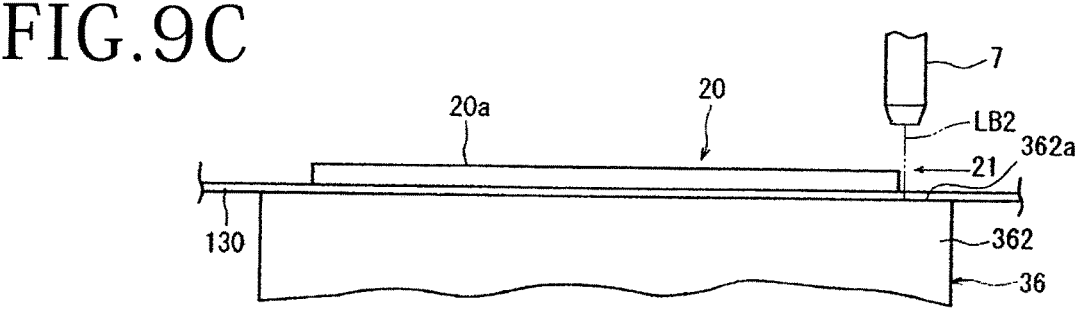
Figure 9D:
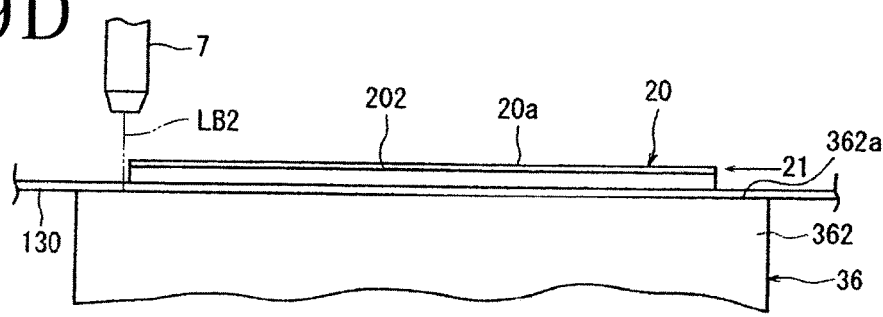

After performing the first laser processed groove forming step along the predetermined division line 21 as mentioned above, the first Y direction moving means 38 is operated to move (index) the holding table 36 in the Y direction by the pitch of the division lines 21, thereby obtaining the condition shown in FIG. 9C (indexing step). Thereafter, the detecting laser beam oscillating means 81 of the detecting means 8 is operated to apply the detecting laser beam LB2 from the focusing means 7 to the semiconductor wafer 20 held on the holding table 36. In the case that the voltage signal (V) input from the photodetector 84 is less than or equal to the predetermined value (V1) (V≤V1), the control means 10 determines that the semiconductor wafer 20 is not present directly below the focusing means 7. In this case, the control means 10 operates the X direction moving means 37 to move the holding table 36 in the direction shown by an arrow X2 in FIG. 9C. Thereafter, when the voltage signal (V) input from the photodetector 84 becomes greater than the predetermined value (V1) (V>V1), the control means 10 determines that the semiconductor wafer 20 is present directly below the focusing means 7. In this case, the control means 10 applies a voltage of 0 V, for example, to the deflection angle adjusting means 64 of the beam deflecting means 60, thereby applying the processing pulsed laser beam LB1 from the focusing means 7. At the same time, the control means 10 operates the X direction moving means 37 to move the holding table 76 in the direction of the arrow X2 in FIG. 9C at a predetermined feed speed (second laser processed groove forming step). Thereafter, when the voltage signal (V) input from the photodetector 84 becomes less than or equal to the predetermined value (V1) (V≤V1), the control means 10 determines that the left end of the present division line 21 adjacent to the above predetermined division line 21 of the semiconductor wafer 20 held on the holding table 36 has been deviated from the position directly below the focusing means 7 as shown in FIG. 9D and that the detecting laser beam LB2 is applied through the dicing tape 130 to the upper surface 362a of the mount member 362 of the holding table 36. In this case, the control means 10 applies a voltage of 10 V, for example, to the deflection angle adjusting means 64 of the beam deflecting means 60 and also stops the movement of the holding table 36. In this manner, the second laser processed groove forming step is performed to thereby form a similar laser processed groove 202 on the semiconductor wafer 20 along the present division line 21 adjacent to the above predetermined division line 21 as shown in FIG. 9D.

After similarly performing the first laser processed groove forming step and the second laser processed groove forming step along all of the division lines 21 extending in the first direction on the semiconductor wafer 20, the holding table 36 is rotated 90° to similarly perform the first laser processed groove forming step and the second laser processed groove forming step along all of the remaining division lines 21 extending in the second direction perpendicular to the first direction. In this manner, the first laser processed groove forming step and the second laser processed groove forming step are performed along all of the crossing division lines 21 extending in the first and second directions on the semiconductor wafer 20. Thereafter, the holding table 36 holding the semiconductor wafer 20 is returned to the original position where the semiconductor wafer 20 has been initially held under suction, and the suction holding of the semiconductor wafer 20 is then canceled at this original position. Thereafter, the semiconductor wafer 20 is transferred by any transfer means (not shown) to a position where a dividing step is performed.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus comprising:
a holding table for holding a workpiece;
laser beam applying means for applying a laser beam to said workpiece held on said holding table;
moving means for relatively moving said holding table and said laser beam applying means;
detecting means for applying detection light to said workpiece held on said holding table and detecting the quantity of reflected light obtained by the reflection of said detection light from said workpiece; and
control means for determining whether or not said workpiece is present at a laser beam applying position according to a detection signal output from said detecting means;
wherein said holding table includes a holding member for holding said workpiece under suction and an annular mount member provided so as to surround said holding member for mounting said holding member, said mount member having an upper surface treated by an irregular reflection process for irregularly reflecting light.

2. The laser processing apparatus according to claim 1, wherein said irregular reflection process comprises blasting.

* * * * *